United States Patent [19]
Nodfelt

[11] Patent Number: 5,511,139
[45] Date of Patent: Apr. 23, 1996

[54] CONNECTING DEVICE FOR CONNECTION OF THE END PORTIONS OF OPTICAL FIBRES

[76] Inventor: Ingvar Nodfelt, Målaregården 8, S-240 21 Loddekopinge, Sweden

[21] Appl. No.: 295,717
[22] PCT Filed: Mar. 1, 1993
[86] PCT No.: PCT/SE93/00141
  § 371 Date: Aug. 26, 1994
  § 102(e) Date: Aug. 26, 1994
[87] PCT Pub. No.: WO93/17359
  PCT Pub. Date: Sep. 2, 1993

[30] Foreign Application Priority Data
  Feb. 28, 1992 [SE] Sweden .................... 9200596

[51] Int. Cl.$^6$ ................................. G02B 6/36
[52] U.S. Cl. .................... 385/60; 385/74; 385/34
[58] Field of Search ............... 385/60, 61, 34, 385/74, 79, 93, 33, 35, 78, 66, 84

[56] References Cited

U.S. PATENT DOCUMENTS

| | | | |
|---|---|---|---|
| 4,265,511 | 5/1981 | Nicia et al. | 385/74 |
| 4,421,383 | 12/1993 | Carlsen | 385/79 |
| 4,691,985 | 9/1987 | Shank et al. | 385/84 |
| 4,711,518 | 12/1987 | Shank et al. | 385/79 |
| 4,770,488 | 9/1988 | Shank et al. | 385/79 |
| 4,776,663 | 10/1988 | Malinge et al. | 385/79 |
| 5,042,891 | 8/1991 | Mulholland et al. | 385/93 |

FOREIGN PATENT DOCUMENTS

| | | | |
|---|---|---|---|
| 0006662 | 8/1980 | European Pat. Off. . | |
| 0380775 | 8/1990 | European Pat. Off. | 385/79 |
| 2334969 | 7/1977 | France | 385/74 |

*Primary Examiner*—John Ngo
*Attorney, Agent, or Firm*—Head, Johnson & Kachigian

[57] ABSTRACT

Connecting device for axial connection of the end portions of at least one optical fibre with another, which are fixed in at least one plug each provided in a coupling house, in order to provide an optical connection between the fibres via a lens connectable to each fibre end, each lens is constituted by a lens body, the front end surface of which is partially spherical and the opposite, rear end surface of which is arranged perpendicular against the longitudinal axis of the lens body. In the coupling house a ring shaped, partially spherical or conical seat is provided for the front end surface of the lens body, which seat is concentric with the longitudinal axis of the coupling house. The plug is insertable in a coaxial guide sleeve guided in the coupling house. The front end of the plug, which is perpendicular to its longitudinal axis, can be pressed to bearing against the rear end surface of the lens body so that the partial spherical end surface of the lens body front, is pressed to bearing against the seat achieving a centering of the lens, the plug and the coupling house relatively each other.

8 Claims, 4 Drawing Sheets

CONNECTING DEVICE FOR CONNECTION OF THE END PORTIONS OF OPTICAL FIBRES

The present invention refers to a connecting device for axial connection of the end portions of at least one optical fibre with another, which are fixed in at least one plug each provided in a coupling house, in order to provide an optical connection between the fibres via a lens connectable to each fibre end.

BACKGROUND OF THE INVENTION

The rapid development of the field of communication has entailed that the need for faster and more reliable transmission media has increased drastically. Optical fibres have revolutionized transmission possibilities. These fibres allow a large number of signals to be transferred in one and the same fibre and with speeds near that of light. Since the fibre length is limited at manufacture, these have to be connected by means of different connecting devices.

Connecting devices have to connect optical fibres with each other, so that the fibre ends are located exactly axially right in front of each other. A problem at connection of optical fibres end-ways with each other is their small diameter, that amounts to some or some tenths of millimeters, while its optical core can have a diameter of 10–50 μm. A deviation of a thousandth part of a millimeters therefore constitutes a coarse deviation, whereby the transmission losses increase drastically. Therefore there are very great demands on the tolerances of the connecting device, which entails complicated designs and high manufacturing costs.

Through the swedish patent application 8903366-6, is known a connecting device for optical fibres, which device requires specially formed means to center optical fibres relatively each other.

Previously known are connecting devices according to the british patent GB-2002136, where a spherical lens is used for transfer of light signals, as well as U.S. Pat. Nos. 4,421,383, 4,691,985, 4,711,518 and 4,770,488 for centering and connection of an optical fibre with a lens device. The lens devices in each connecting device are used to transmit the light between two fibre ends. In these documents there are no directions of how the centering of the glass fibre relatively the lens and the coupling house should be achieved.

Purpose and most essential features of the invention

The purpose of the invention is to achieve a connecting device for very thin optical fibres, which enables a very secure and exact centering and connection of the fibre ends, which makes it possible to connect fibres of different size and which counteracts deformations of the optical fibres at the connection. By means of the connecting device self-centering lenses are obtained, which are used for transmission of light signals between two fibre end portions. In addition the manufacture of the connecting device shall be simple and cheap. These tasks have been solved by each lens being constituted by a lens body, the front end surface of which is partial spherical and the opposite rear end surface of which is arranged perpendicular against the longitudinal axis of the lens body, that in the coupling house is provided a ring shaped, partial spherical or conical seat for the front end surface of the lens body, which seat is concentric with the longitudinal axis of the coupling house, that the plug is insertable in a coaxial guide sleeve guided in the coupling house, and that the front end of the plug, which is perpendicular versus its longitudinal axis, can be pressed to bearing against the rear end surface of the lens body so that the front, partial spherical end surface of the lens body is pressed to bearing against the seat achieving a centering of the lens body, the plug and the coupling house relatively each other.

DESCRIPTION OF THE DRAWINGS

The invention will be described below with reference to an embodiment shown in the accompanying drawings.

DESCRIPTION OF THE EMBODIMENTS

Figure 1:
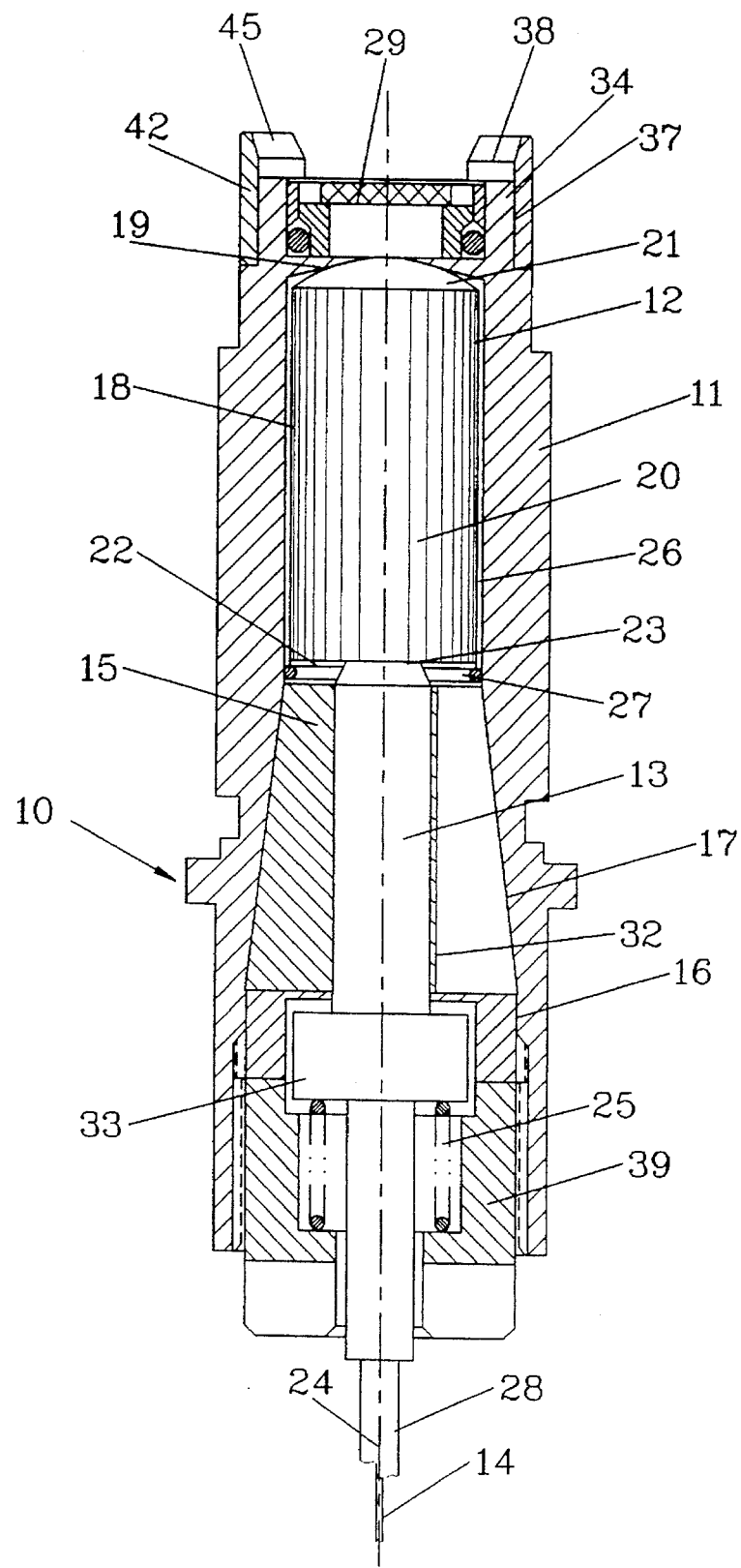
FIG. 1 shows a section through a part of a connecting device according to the invention.

The insertion device 10 shown in FIG. 1 consists of a coupling house 11, that comprises primarily a lens 12 for transmission of light signals and a plug 13, that is designed as a holder for reception and fixation of several optical fibres 14, surrounded by an outer protection 28. The plug 13 is guided in the coupling house 11 by means of a conical guide sleeve 15, provided in a recess 17 designed with corresponding draught, which is coaxial with the longitudinal axis 24 of the coupling house. The conical recess 17 passes into a cylindric channel 18, which has somewhat larger diameter than the lens 12. The channel 18 at the end opposite the guide sleeve 15 is formed with a ring shaped partial spherical or conical seat 19, which is concentric with the longitudinal axis 24 of the coupling house 11. The plug 13 is of conventional type and can exist in different sizes, why even the guide sleeve 15 is manufactured in different sizes. At the front end of the coupling house 11, ie. the end that is intended to be connected axially with a second connecting device, is formed with a guide dowel 34, the peripheral guide surface 37 of which is coaxial with the longitudinal axis 24 of the coupling house 11. A coupling sleeve 42 is applied with press fit against the guide surface 37 with pins 38 extending from this, and between these pins located recesses 47, and the end surfaces 45 of which pins are perpendicular relatively the length axis 24 of the coupling house 11, which in turn is coaxial with the optical axis of the connection device.

At a connection of two similar connecting devices 9, said pins 38 will be brought into the recesses 47 of the second connection device so that both connecting devices are located in the exact axial extension of each other. The manufacture of the coupling house is appropriately carried out by turning, whereby the conical recess 17, the channel 18, the seat 19 and the guide surface 37 are turned at one and the same tooling in the lathe, so that these are absolutely mutually coaxial. The manufacturing process thereby becomes simple and cheap.

The lens 12 is constituted by a lens body 20, with a front partial spherical surface 21 and a rear, flat end surface 22, that is perpendicular to the longitudinal axis of the lens. The end surfaces 21 and 22 of the lens are anti-reflex treated to achieve as loss free and free of reflex transmission as possible. The lens 12 is pressed with its partial spherical end against the seat 19, by means of a spring 25 or the like, which spring also acts on the plug 13, which with its front end surface bears against the lens 12 with a even pressure. By giving the lens 12 a play 26 in the lateral direction, this may be centered under the pressure of the plug 13. The mobility of the lens along the seat 19 entails that the end surface 23 of the plug 13 comes to full, plan bearing against the end surface 22 of the lens 12 and thereby also the end surface of the fibre. The lens 12 at its rear end is fixed in the channel by means of a lock ring 27, while its front end 21 is protected against dirt and shock by means of a protection glass 29.

Figure 4:
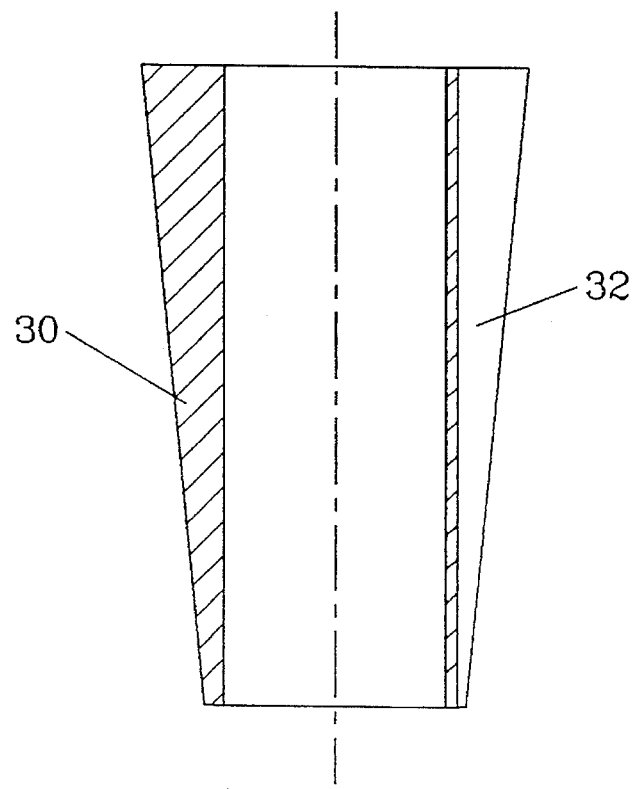
FIG. 4 shows a section through a centering means contained in the connecting device.
Figure 5:
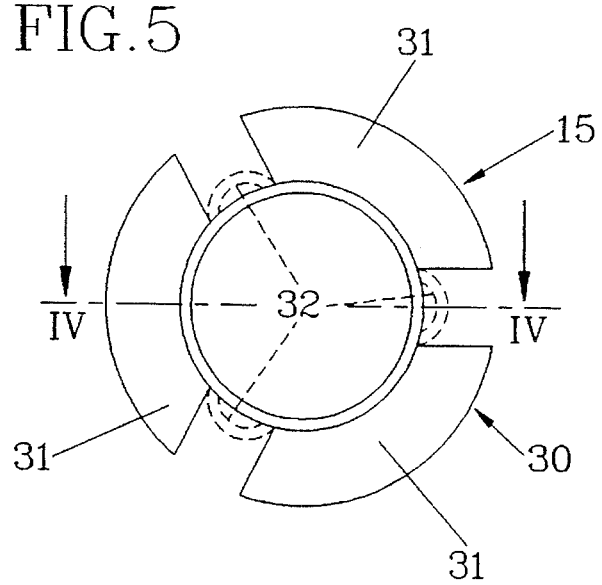
FIG. 5 shows a bottom view of the centering means according to FIG. 4.

The guide-sleeve 15 is constituted by a socket 30, that can be cylindric (according to FIG. 2) or conical designed (according to FIG. 1). An embodiment of the later is shown in FIG. 4 and 5. The socket 30 is formed with resilient sectors 31, connected to each other via thin, material weakened axial portions 32. The socket 30 is designed with a decreasing diameter in direction towards the lens 12. In this embodiment the inner wall surface of the guide sleeve 15 forms the inner guide element of the plug 13, while the outer envelope surface of the sleeve forms its outer guide element. The conical socket 30 on the inside is shaped after the outer form of the plug 13, which in this embodiment is cylindric. The plug 13 is provided with a peripheral flange 33, which forms a stop for the spring 25, the pre-stress of which is controllable by means of a nut 39. At the pressing of the guide sleeve 15 in the conical recess 17 the thin portions 32 bulge outwards, such as is indicated by dash-dotted lines in FIG. 5, and thus the inner limitation of the sleeve therefore can adapt to the diameter of the plug 13.

Figure 2:
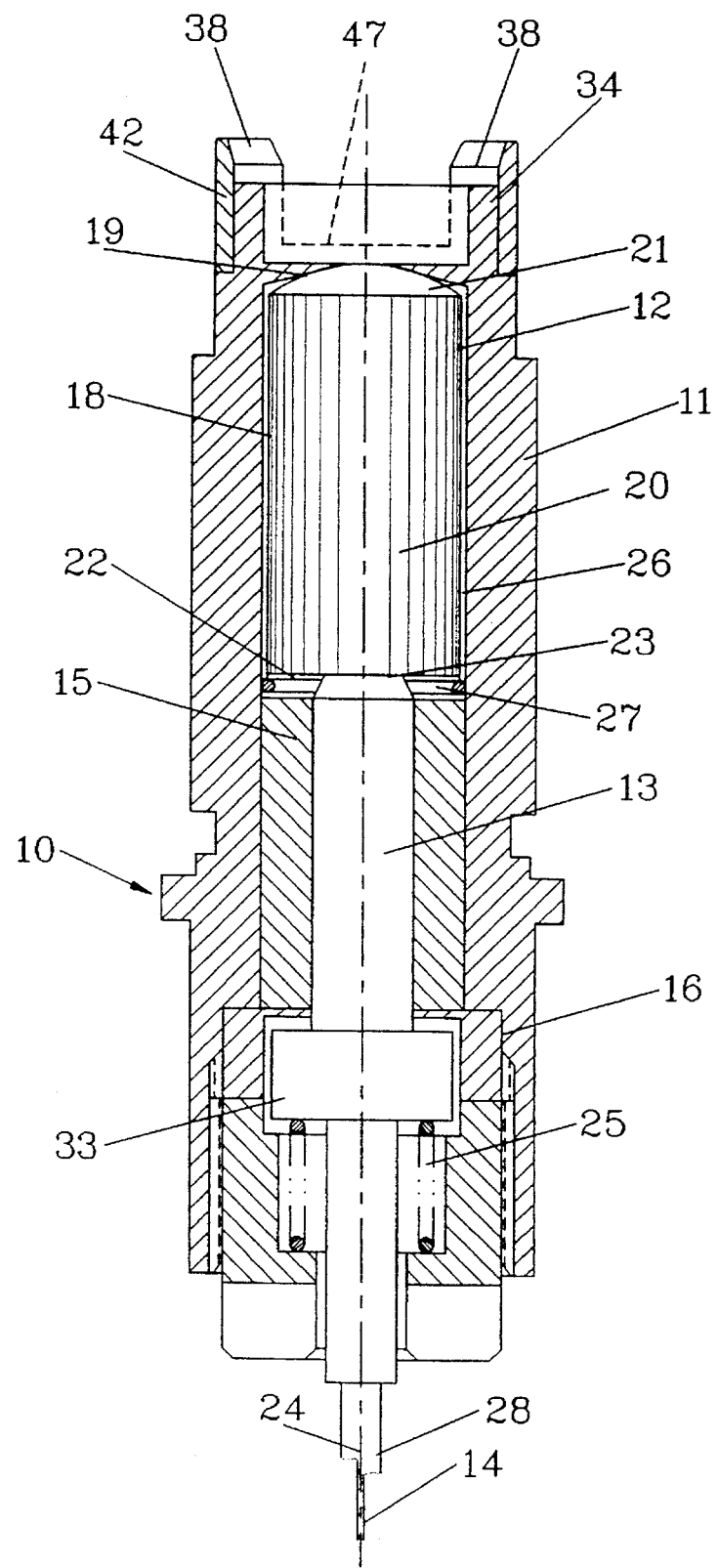
FIG. 2 shows a section analogous with FIG. 1 of a modified connecting device.

In the embodiment shown FIG. 2, a connecting device is disclosed in which the protection glass 29 has been taken away and the conical guide-sleeve 15 has been replaced by a cylindric guide-sleeve, whereby even the channel 18 is cylindric. In this embodiment as well the channel wall is coaxial with the seat 19.

Figure 3:
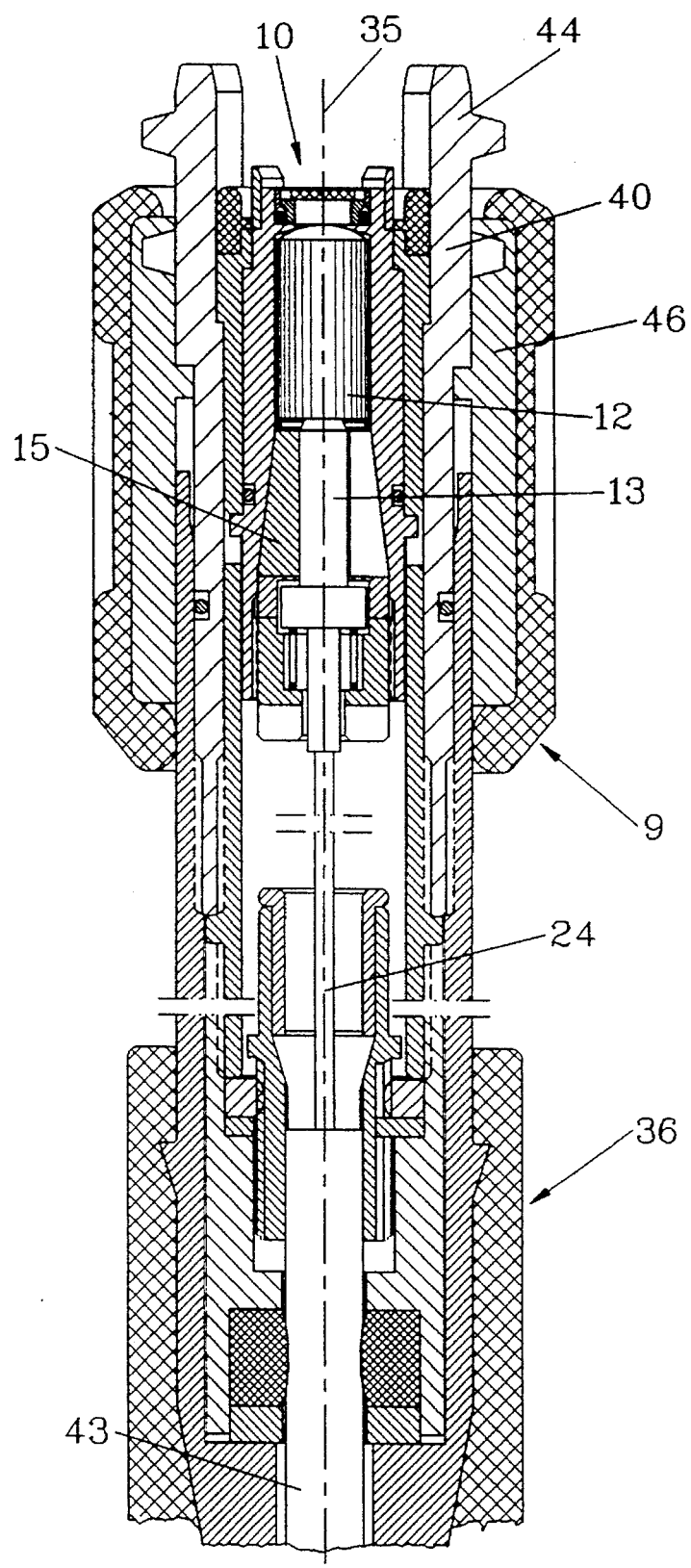
FIG. 3 shows in reduced scale the connection device shown in FIG. 1 in complete form.

The complete connecting device 9 shown in FIG. 3 comprises the insertion device 10 according to FIG. 1 or alternatively according to FIG. 2, a connection sleeve 40 provided with guide segments 44, provided preferably at the front end 35 of the connecting device 9, a barrel nut 41 or the like, and stress-relieving devices 36 for stress-relief of the optical fibre cable A connecting device 9 is connected to a second similar connecting device, by means of its pins 38 and guide segments 44 being brought into interaction with each other, ie. they engage each other and form a whole or a partial cylindric surface, whereupon a connection nut 46 fixes the connecting devices in an axial stationary position.

REFERENCE NUMERALS

9 Connecting device
10 Insertion device
11 Coupling house
12 Lens
13 Plug
14 Optical fibre
15 Guide sleeve
16 Accommodation
17 Conical recess
18 Channel
19 Seat
20 Lens body
21 Lens front surface
22 Lens rear end
23 Dowel front end
24 Longitudinal axis
25 Spring
26 Play
27 Lock ring
28 Protection
29 Protection glass
30 Conical sleeve
31 Resilient sector
32 Axial portions
33 Peripheral flange
34 Guide pin
35 Front end of the connecting device
36 Stress-relief device
37 Guide surface
39 Nut
40 Connection sleeve
41 Barrel nut
42 Coupling sleeve
43 Optical fibre cable
44 Guide
45 End surface
46 Connection nut
47 Recess

I claim:

1. A connecting device for axial connection of the end portions of optical fibers, comprising:

a coupling housing having a longitudinal axis;

a lens having a lens body with a longitudinal axis, a front end surface partially spherical, and an opposite, rear surface arranged perpendicular to the longitudinal axis of said lens body;

a ring shaped, partially spherical or conical seat within said coupling housing being adapted to receive said lens body front end surface and being concentric with said longitudinal axis of said coupling housing;

an optical fiber connecting plug having a front end, a rear end, and a longitudinal axis and being received in said coupling housing, the front end of the plug being perpendicular to said longitudinal axis of said plug and contact with said rear end surface of said lens body and serving to press said partial spherical end surface of said lens body front surface against said seat to achieve a centering of said lens, said plug and said coupling housing being thereby supported relative to each other; and a guide sleeve being coaxial with said coupling housing and having a conical-shaped outer surface having a diameter decreasing in direction towards said lens and being received in said coupling housing for guiding said plug into an axial recess provided in said coupling housing, the sleeve being fitted into the recess, which recess is concentric with said ring shaped seat in said coupling housing.

2. A connecting device according to claim 1 wherein said front end of said coupling house has axial and radial guide dowels provided for interaction with corresponding guide dowels of a second connecting device axially interconnectable with the connecting device.

3. A connecting device for axial connection of end portions of optical fibers, comprising:

a coupling housing having a longitudinal axis;

a lens including a lens body having a longitudinal axis, a front end surface partially spherical, and an opposite, rear surface arranged perpendicular to the longitudinal axis of said lens body;

a ring shaped, partially spherical or conical seat within said coupling housing being adapted to receive said lens body front end surface and being concentric with said longitudinal axis of said coupling housing;

an optical fiber connecting plug having a front end and a rear end, a longitudinal axis and being received in said coupling housing, the front end of the plug being perpendicular to said longitudinal axis of said plug and contact with said rear end surface of said lens body and serving to press said partial spherical end surface of said lens body front surface against said seat to achieve a centering of said lens, said plug and said coupling housing being thereby supported relative to each other;

a guide sleeve being coaxial with said coupling housing and received therein for guiding said plug into said coupling housing, the guide sleeve inserted in an axial recess provided in said coupling housing, said sleeve being fitted into said recess, which recess is concentric with said ring shaped seat in said coupling housing; and means for reception and fixation of several optical fibers.

4. A connecting device according to claim 3 wherein said guide sleeve has a conical-shaped outer surface having a diameter decreasing in direction towards said lens and being received in said plug.

5. A connecting device according to claim 3 wherein said front end of said coupling house has axial and radial guide dowels provided for interaction with corresponding guide dowels of a second connecting device axially interconnectable with the connecting device.

6. A connecting device for axial connection of end portions of optical fibers, comprising:

a coupling housing having a longitudinal axis;

a lens including a lens body having a longitudinal axis, a front end surface partially spherical, and an opposite, rear surface arranged perpendicular to the longitudinal axis of said lens body;

a ring shaped, partially spherical or conical seat within said coupling housing being adapted to receive said lens body front end surface and being concentric with said longitudinal axis of said coupling housing;

an optical fiber connecting plug having a front end, a longitudinal axis, and a rear end and being received in said coupling housing, the front end of the plug being perpendicular to said longitudinal axis of said plug and contact with said rear end surface of said lens body and serving to press said partial spherical end surface of said lens body front surface against said seat to achieve a centering of said lens, said plug and said coupling housing being thereby supported relative to each other; and a guide sleeve being coaxial with said coupling housing and received therein for guiding said plug into said coupling housing, the guide sleeve being inserted in an axial recess provided in said coupling housing, the sleeve being fitted into the recess, which recess is concentric with said ring shaped seat in said coupling housing.

7. A connecting device according to claim 6 wherein said guide sleeve has a conical-shaped surface.

8. A connecting device according to claim 6 wherein said guide sleeve has a cylindrical surface.

* * * * *